United States Patent

Krause

[15] 3,653,009

[45] Mar. 28, 1972

[54] CORRECTION OF ASYNCHRONOUS TIMING UTILIZING A PHASE CONTROL LOOP

[72] Inventor: Peter L. Krause, Thousand Oaks, Calif.

[73] Assignee: Burroughs Corporation, Detroit, Mich.

[22] Filed: Oct. 12, 1970

[21] Appl. No.: 80,092

[52] U.S. Cl. ..............................340/174.1 A, 340/174.1 B

[51] Int. Cl. ..............................G11b 5/02, G11b 5/44

[58] Field of Search ..............340/174.1 A, 174.1 B, 174.1 G, 340/174.1 H

[56] References Cited

UNITED STATES PATENTS

| | | | |
|---|---|---|---|
| 3,496,557 | 2/1970 | Lowrance | 340/174.1 A |
| 3,488,452 | 1/1970 | Gunning et al. | 340/174.1 B |

*Primary Examiner*—Stanley M. Urynowicz, Jr.
*Assistant Examiner*—Vincent P. Canney
*Attorney*—Christie, Parker & Hale

[57] ABSTRACT

Binary data is stored on a moving magnetic medium as data transitions occurring at multiples of a nominal time interval and pairs of control transitions are recorded on the medium between successive data transitions whenever data transitions occur at some given multiple of the nominal time interval that is larger than one. The time interval between the pair of control transitions is substantially smaller than the nominal time interval. Variations in the speed of the medium during recording are sensed and the time of occurrence of the pair of control transitions is adjusted as the speed of the medium varies to maintain a predetermined spacing relative to the successive data transitions between which the pair of control transitions is recorded. An oscillator synchronized to a multiple of the frequency of occurrence of clock transitions on the medium and a counter responsive to the oscillator are employed both to retrieve and to store data. During retrieval, the states of the counter provide a group of successive strobe pulses, the sum of the durations of which remain equal to the period between clock transitions as the speed of the medium varies. During storage, the data and control transitions are recorded on the medium responsive to selected states of the counter to maintain the predetermined spacing between data and control transitions as the speed of the medium varies.

16 Claims, 3 Drawing Figures

INVENTOR.
PETER L. KRAUSE
BY
Christie, Parker, & Hale
ATTORNEYS

CORRECTION OF ASYNCHRONOUS TIMING UTILIZING A PHASE CONTROL LOOP

BACKGROUND OF THE INVENTION

This invention relates to information storage and retrieval on a moving magnetic storage medium, such as a disc, tape, or drum, and, more particularly, to an improvement in a technique for reducing the effects of pulse crowding.

Binary data is stored on moving magnetic mediums, such as discs, tapes, and drums, as transitions in magnetization between two saturation states. The data is represented by the state of magnetization of the medium during intervals on the medium called "bit cells." Thus, the data transitions are spaced apart by one or more bit cells depending upon the data content. The bit cells are conventionally defined by uniformly spaced transitions in magnetization on a clock track or channel of the medium. A copending application of Behr, Blessum, and Wang, Ser. No. 840,394, filed on July 9, 1969, now U.S. Pat. No. 3,614,758, teaches the recordation of closely spaced pairs of control transitions between data transitions that are spaced further apart than one bit cell. It has been found that the presence of the control transitions in bit cells that do not have data transitions substantially reduces the deterioration of the signal produced when the data is retrieved from the medium. Such deterioration, which is due to pulse crowding, manifests itself as amplitude variations and shifts of the signal peaks that represent data transitions. Further, since the control transitions appear in very closely spaced pairs, they are not resolved by the readhead that produces the retrieved signal. This copending application teaches the desirability of recording the control transitions at predetermined points within a bit cell relative to the bit cell position of the data transitions. In one embodiment, delay circuits are utilized to place one control transition one-quarter of a bit cell before the bit cell position of data transitions and the other control transition one-eighth of a bit cell after the bit cell position of data transitions.

SUMMARY OF THE INVENTION

The invention contemplates the adjustment of the time of occurrence of pairs of control transitions recorded on a moving magnetic storage medium as the speed of the medium varies to maintain a predetermined spacing relative to the data transitions recorded on the medium.

Preferably, clock transitions are recorded along the length of the medium at constant intervals. Variations in the speed of the medium during storage are sensed by retrieving the clock transitions from the medium and synchronizing an oscillator in phase to a multiple of the clock transition frequency. A counter is advanced in state responsive to the pulses produced by the oscillator. The control transitions are produced responsive to selected pairs of states of the counter so their time of occurrence changes in correspondence with changes of the period of the clock transitions during recording. Pulses to be synchronized to the clock transitions are produced responsive to a single state of the counter. Thus, there is formed a phase control loop that also corrects for the effect of variations in the electronic components on the time of occurrence of the control transitions.

A feature of the invention is the use of the same clock synchronizing apparatus to retrieve and store data on the medium. During retrieval, responsive to the clock transitions, there are generated a group of successive strobe pulses, the sum of the durations of which equals the period between clock transitions. During storage, selected ones of the generated strobe pulses are employed to produce the control transitions.

BRIEF DESCRIPTION OF THE DRAWINGS

The features of a specific embodiment of the best mode contemplated of carrying out the invention are illustrated in the drawings, in which.

DETAILED DESCRIPTION Of THE SPECIFIC EMBODIMENT

Figure 1:
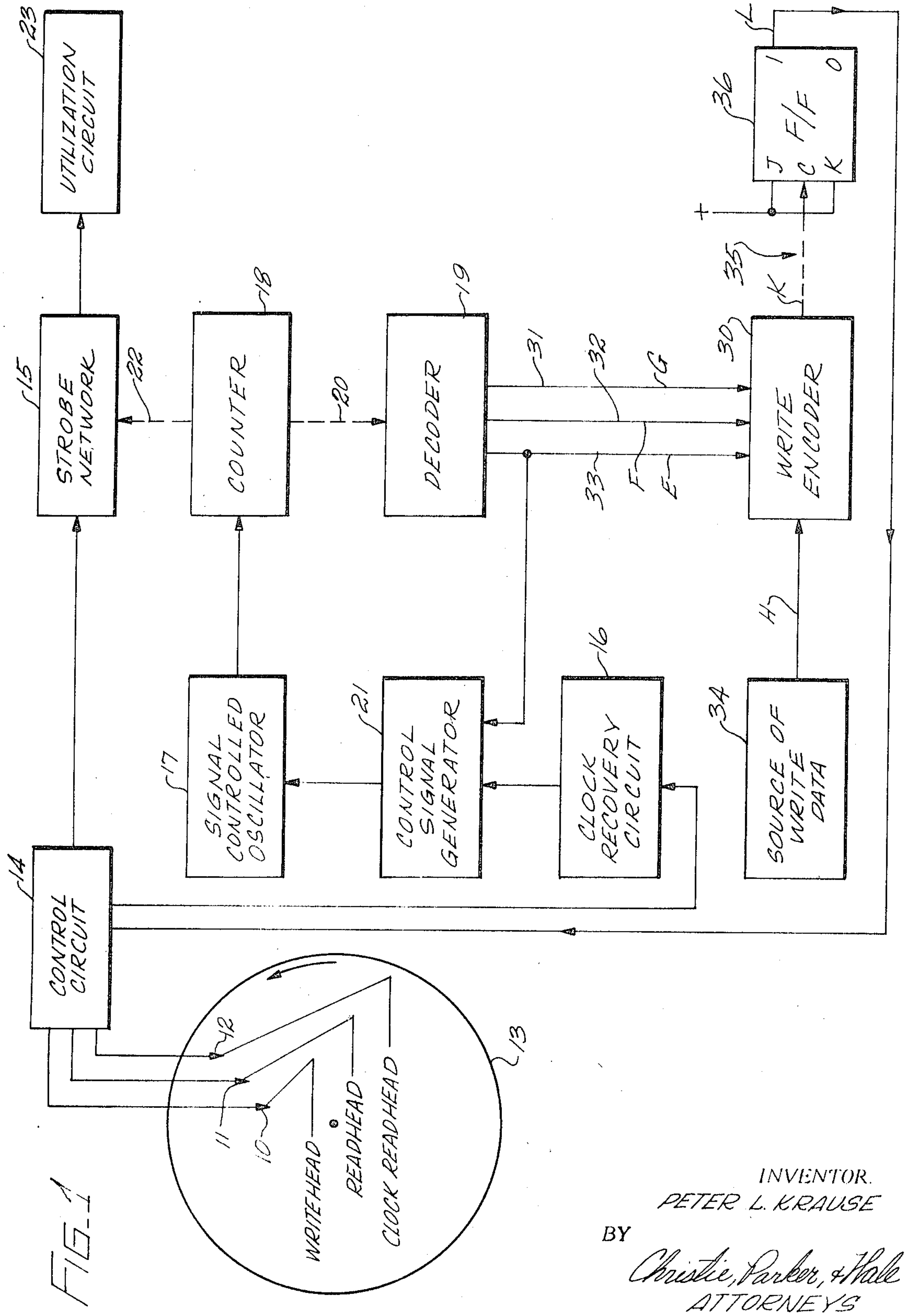
FIG. 1 is a schematic block diagram of a disc file information storage and retrieval system.

In FIG. 1, a magnetic data writehead 10, a magnetic data readhead 11, and a magnetic clock readhead 12 are disposed in close proximity to a layer of magnetic material on a continuously rotating disc 13. For the purpose of discussion only, a single clock track and a single data track on disc 13 are considered, although in practice disc files normally have a large number of data tracks and several clock tracks. Further, the role of address tracks on disc 13 is not considered because the addressing function is not pertinent to the invention. Readhead 11 and writehead 10 are aligned radially with a data track on disc 13 so writehead 10 can record in such track transitions in magnetization between two saturation states and readhead 11 can sense such transitions. It is assumed that prerecorded transitions in magnetization are uniformly spaced along the clock track. These transitions are sensed by clock readhead 12 and employed to control the storage and retrieval of data transitions by writehead 10 and readhead 11. Waveforms A through 1L, respectively, in FIG. 3 depict the signals appearing at the various points in the diagrams of FIGS. 1 and 2 which are marked with the same letters as the waveforms.

Writehead 10, readhead 11, and clock readhead 12 are coupled to a control circuit 14, which selectively connects the appropriate magnetic heads to electronic circuitry depending upon the operation, i.e., storage or retrieval, being performed, and the address of the concerned portion of disc 13.

During data retrieval, readhead 11 produces an electrical data signal representative of the data transitions on disc 13 and control circuit 14 couples the data signal to a strobe network 15. Copending application Ser. No. 660,485, of Anderson, Jorgenson, and Vigil, filed on Aug. 14, 1967 now U.S. Pat. No. 3,537,075, discloses in more detail the function of control circuit 14 and strobe network 15. Clock readhead 12 produces an electrical clock signal representative of the clock transitions on disc 13 and control circuit 14 couples the clock signal to a clock recovery circuit 16. Clock recovery circuit 16 forms well shaped clock pulses from the clock signal. A signal controlled oscillator 17 produces pulses at a frequency that is nominally a multiple of the frequency of the clock pulses. For the purpose of discussion, this multiple is assumed to be eight. Oscillator 17 is connected to a counter 18 that has eight states, i.e., the same number of states as the previously mentioned multiple. Each pulse produced by oscillator 17 triggers a change in state of counter 18. Thus, counter 18 cycles after each group of eight pulses from oscillator 17. Counter 18 is coupled to a decoder 19 by a plurality of connections represented by a dashed line 20. Decoder 19 produces a number of series of pulses responsive to selected states of counter 18. Each of these series of pulses occurs at a frequency that is one-eighth of the frequency of oscillator 17, and is shifted in phase relative to the remaining series by *n*/8 of the oscillator 17, where *n* is an integer between 7 and 7. One series of pulses produced by decoder 19, hereafter called derived clock pulses, and the recovered clock pulses produced by clock recovery circuit 16 are coupled to a control signal generator 21. Control signal generator 21, which is connected to the frequency control input of signal controlled oscillator 17, produces an error signal proportional in amplitude to the phase difference between the derived clock pulses and the recovered clock pulses. Accordingly, signal controlled oscillator 17, counter 18, decoder 19, and control signal generator 21 function as a control loop to synchronize the phase of the derived clock pulses to the recovered clock pulses. Most advantageously, control signal generator 21 is constructed in the manner taught in my copending application Ser. No. 780,160, filed on Nov. 29, 1968, and assigned to the assignee of the present application.

The states of counter 18 define time intervals that in essence divide the time between the clock transitions from disc 13 into eight equal segments, irrespective of variations in the period of the clock transitions read from disc 13 during retrieval. As represented by a dashed line 22, leads corresponding to the eight counter states are coupled from counter 18 to strobe network 15. The eight leads are energized in succession as counter 18 advances through its eight states. In other words, the leads represented by line 22 couple from counter 18 to strobe network 15 a repetitive group of eight successive strobe pulses, the sum of the duration of which equals the period between the recovered clock pulses. As taught in U.S. Pat. No. 3,537,075, strobe network 15 selects for use in the recovery of the data signal one of the eight strobe pulses produced responsive to each clock pulse. Strobe network 15 produces a binary signal that comprises sharp transitions between two levels of potential, e.g., positive potential and ground, corresponding to the data transitions on disc 13. The output of strobe network 15 is coupled to a utilization circuit 23.

During data storage, the control loop described above in connection with the retrieval operation also functions to synchronize the derived clock pulses produced by decoder 19 with the recovered clock pulses produced by clock recovery circuit 16. Further, decoder 19 produces one data pulse responsive to one selected state of counter 18 and two control pulses responsive to two other selected states of counter 18. The states of counter 18 are selected so the time interval between the two control pulses results in control transitions spaced substantially closer together on disc 13 than the gap length of readhead 11, so the pairs of control transitions are not resolved by readhead 11. Preferably, the space between control transitions is less than half the gap length. The control pulses are coupled to a write-encoder 30 by a lead 31. The data pulses are coupled to write-encoder 30 by a lead 32 and the derived clock pulses are coupled to write-encoder 30 by a lead 33. Depending upon the pulses provided by a source of write data 34, which is coupled to write-encoder 30, write-encoder 30 transmits under control of the derived clock pulses on lead 33 either the control pulses on lead 31 or the data pulses on lead 32 via a long data line 35 to a flip-flop 36. The raw write data provided by source 34 represents as binary transitions occurring at multiples of the clock period the data to be recorded on disc 13 during the storage operation period. As depicted by waveforms F, G, H, and K, write-encoder 30 produces two closely spaced control pulses when the raw data has no transition in a bit cell and produces a single data pulse when the raw data has a transition in a bit cell. Long line 35 could be terminated at its ends by a line driver and a line receiver if necessary. Flip-flop 36 is a bistable device having inputs J, C, and K and outputs "1" and "0". When the inputs take on the potentials: J positive and K ground, J ground and K positive, J and K ground, J and K positive; then immediately following a transition from positive to ground potential of the C input, the outputs respectively take on the potentials: "1" positive and "0" ground, "0" positive and "1" ground, "0" and "1" retain their potentials held previous to the transition at input C, "0" and "1" change their potentials held previous to the transition at input C. Long line 35 is connected to the C input of flip-flop 36 and the J and K inputs of flip-flop 36 are connected to a source of positive potential. Thus, flip-flop 36 changes state at the trailing edge of each pulse transmitted to the C input by write-encoder 30, as depicted by waveforms K and L in FIG. 3. The "1" output of flip-flop 36 is connected through control circuit 14 to writehead 10, thereby producing the data transitions on disc 13.

Figure 2:
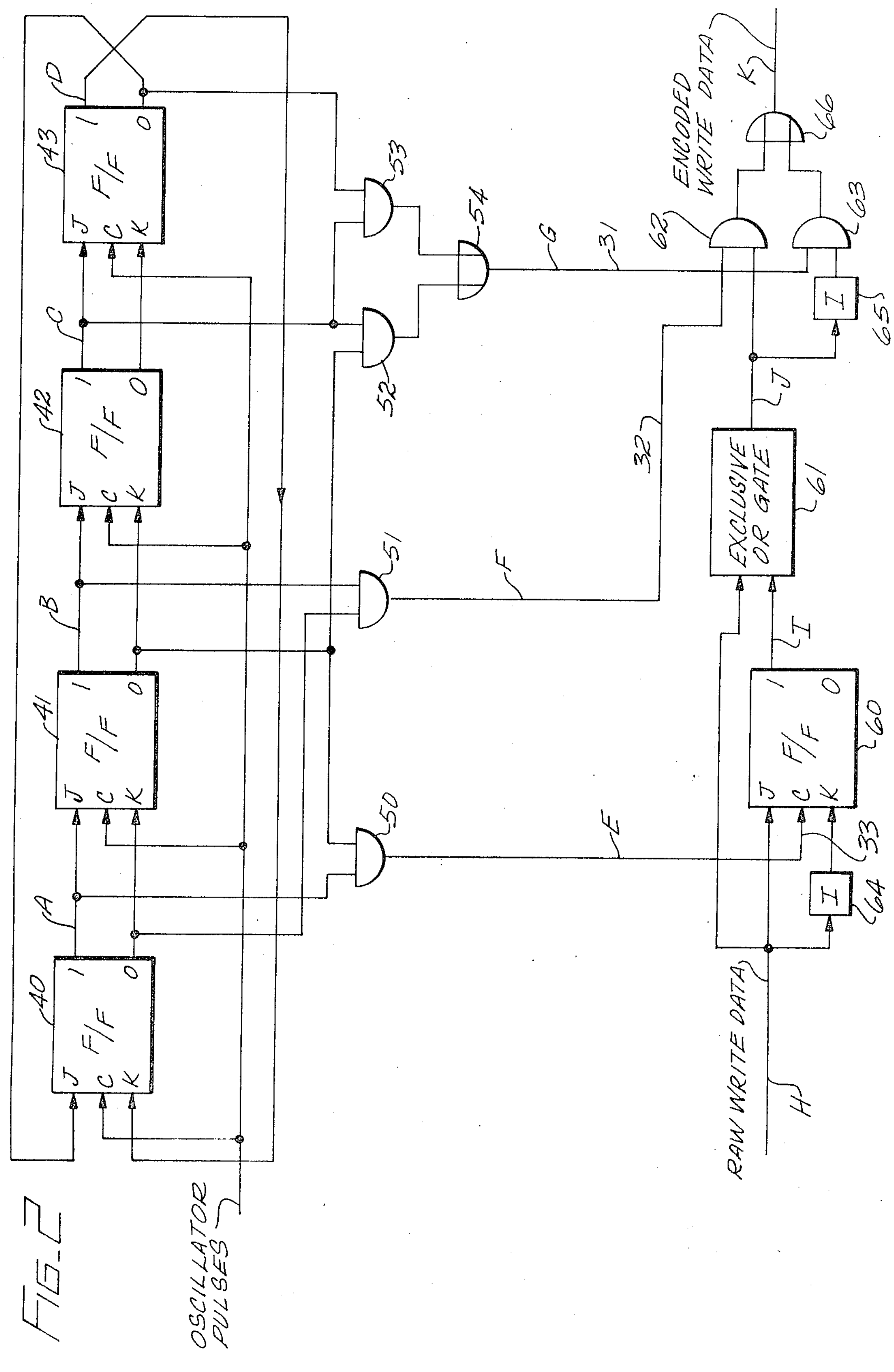
FIG. 2 is a schematic block diagram of the counter, decoder, and write-encoder shown in FIG. 1.
Figure 3:
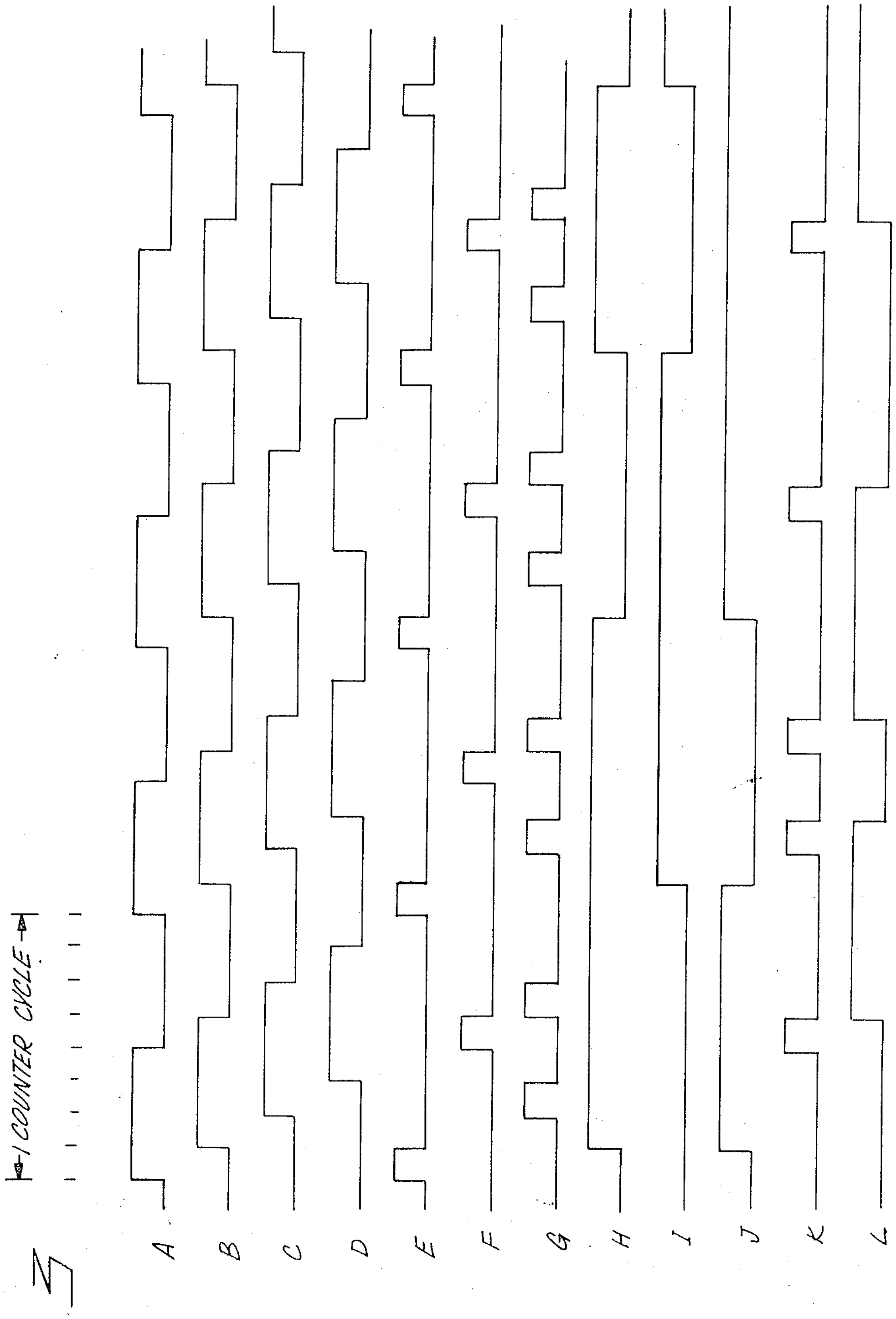
FIG. 3 is a diagram of the waveforms appearing at the various points of the diagrams shown in FIGS. 1 and 2.

FIG. 2 shows counter 18, decoder 19, and write-encoder 30 in detail. Counter 18 comprises flip-flops 40, 41, 42, and 43, which are identical to flip-flop 36 in FIG. 1. As illustrated, the pulses produced by oscillator 17 are coupled to the C input of each of flip-flops 40 through 43; the "1" output of each of flip-flops 40, 41, and 42 is connected to the J input of the following flip-flop; and the "0" output of each of flip-flops 40, 41, and 42 is connected to the K input of the following flip-flop. The "1" and "0" outputs of flip-flop 43 are connected, respectively, to the K and J inputs of flip-flop 40 to complete a closed regenerative chain. As illustrated by waveforms A, B, C, and D in FIG. 3, flip-flops 40, 41, 42, and 43 change states consecutively responsive to successive oscillator pulses and are in each state for one-half of the counter cycle, which equals the period between successive clock pulses. The hash marks above waveform A represent the trailing edges of the oscillator pulses. A pulse representative of each state of the counter can be obtained from the output of an AND gate simply by connecting particular combinations of two outputs from flip-flops 40 through 43 to the inputs of the AND gate.

This principle is employed to implement decoder 19, which comprises AND gates 50, 51, 52, and 53, and an OR gate 54. The "1" output of flip-flop 40 and the "0" output of flip-flop 41 are connected to the inputs of AND gate 50. As depicted by waveforms A, B, and E, AND gate 50 produces derived clock pulses that occur during the first state of the counter. The "1" output of flip-flop 41 and the "0" output of flip-flop 40 are connected to the inputs of AND gate 51. As depicted by waveforms A, B, and F, AND gate 51 produces data pulses during the fifth state of the counter. The "1" output of flip-flop 42 is connected to one input of each of AND gates 52 and 53, the "0" output of flip-flop 41 is connected to the other input of AND gate 52, and the "0" output of flip-flop 43 is connected to the other input of AND gate 53. The outputs of the AND gates 52 and 53 are combined by an OR gate 54. As depicted by waveforms B, C, D, and G, AND gates 52 and 53 produce control pulse pairs during the third and sixth states of the counter. Pulses corresponding to the other states of the counter for application to strobe network 15 (FIG. 1) can be generated in the same manner by connecting different combinations of the outputs of flip-flops 40 to 43 through the inputs of AND gates.

Write-encoder 30 comprises a flip-flop 60, an exclusive OR gate 61, AND gates 62 and 63, inverters 64 and 65, and an OR gate 66. Flip-flop 60 is identical to the other flip-flops described in connection with FIGS. 1 and 2. The output of AND gate 50 is connected by lead 33 to the C input of flip-flop 60. The raw write data from source 34 is directly coupled to the J input of flip-flop 60 and is coupled through inverter 64 to the K input thereof. This raw write data appears at the "1" output of flip-flop 60 delayed by one clock pulse period, as illustrated by a comparison of waveforms H and I in FIG. 3. The raw write data from source 34 and the delayed raw write data from the "1" output of flip-flop 60 are applied to the inputs of exclusive OR gate 61, a well-known logical building block that produces a binary signal of positive potential when the binary signals applied to its inputs differ, and a binary signal of ground potential when the binary signals apply to its inputs are the same. The output of exclusive OR gate 61 is directly connected to one input of AND gate 62 and connected through inverter 65 to one input of AND gate 63. The output of OR gate 54 is coupled by lead 31 to the other input of AND gate 63 and the output of AND gate 51 is coupled by lead 32 to the other input of AND gate 62. The outputs of AND gates 62 and 63 are combined by OR gate 66, which is connected to long line 35 of FIG. 1. Exclusive OR gate 61 serves to enable AND gates 62 and 63 alternatively so as to transmit to the output of OR gate 66 during each and every clock pulse period, either a data pulse or a pair of control pulses. When the output of exclusive OR gate 61 is at a positive potential, which signifies that a binary transition in the raw write date has occurred during the clock pulse period in question, AND gate 62 is enabled and a data pulse is transmitted to the output of OR gate 66. This case is demonstrated by waveforms H, I, J, F, and K during the first counter cycle shown in FIG. 3. When the output of exclusive OR gate 61 is at ground potential, which signifies that no binary data transition in the raw write data has occurred during the clock pulse period in question, AND gate 63 is enabled and a pair of control pulses is transmitted to the output of OR gate 66. This is depicted by waveforms H, I, J, G, and K during the second counter cycle shown in FIG. 3.

In summary, the clock pulse period is divided into eight equal time intervals that are adjusted as the clock pulse period varies. Accordingly, the time of occurrence of a pair of control transitions recorded on disc 13 relative to the adjacent data transitions can be precisely maintained as the speed of rotation of disc 13 or the spacing between clock transitions on disc 13 varies. Oscillator 17, counter 18, and generator 21, which are shared by the retrieval and storage circuitry, form a phase control loop that corrects for the effect of component tolerances on the time of occurrence of the control and data pulses during storage.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, more than one pair of control transitions could be recorded in bit cells without data transitions, or a gap between data transitions of two or more bit cells could be required before a pair of control transitions is recorded.

What is claimed is:

1. In a magnetic storage and retrieval system wherein input information is recorded on a moving magnetic medium as transitions in magnetization between two saturation states occurring at multiples of a nominal time interval corresponding to a minimum spacing and the transitions are detected by a magnetic readhead having a gap of predetermined length, the method of reducing the effective spacing between the transitions on the recording medium to a maximum value at least as large as the minimum spacing, the method comprising the steps of:

sensing when the spacing between successive data transitions in response to the input information is greater than the maximum value;

recording at least one pair of control transitions in between successive data transitions on the recording medium whenever successive data transitions are spaced in excess of the maximum value;

sensing the variations in the speed of the medium during recording; and adjusting the time of occurrence of the pair of control transitions as the speed of the medium varies to maintain a predetermined spacing relative to the successive data transitions between which the pair of control transitions is recorded.

2. The method of claim 1, in which the maximum value is substantially the same as the minimum spacing.

3. The method of claim 1, in which the spacing on the medium between each pair of control transitions is smaller than half the gap length of the associated readhead.

4. The method of claim 1, in which the minimum spacing on the medium is defined by continuously spaced clock transitions recorded on the medium, the step of sensing variations in the speed of the medium comprises the step of sensing variations in the time of occurrence between the clock transitions, and the step of adjusting the time of occurrence of the pair of control transitions adjusts the time of occurrence of the pair of control transitions to maintain a constant relationship to the time of occurrence of the clock transitions.

5. In a magnetic storage and retrieval system wherein input information is recorded on a magnetic medium as transitions in magnetization between two saturation states spaced at multiples of a nominal interval and the transitions are detected by a magnetic readhead having a gap of predetermined length, the method of reducing the effective spacing between the transitions on the recording medium to a maximum value at least as large as the nominal interval, the method comprising the steps of:

sensing when the spacing between successive date transitions in response to the input information is greater than the maximum value;

recording at least one pair of control transitions in between successive data transitions on the recording medium whenever successive data transitions are spaced in excess of the maximum value, the spacing between the pair of control transitions being substantially smaller than the nominal interval;

sensing variations in the nominal interval; and adjusting the position of the pair of control transitions recorded on the recording medium to correspond to the variations in the nominal interval.

6. The method of claim 5, in which the maximum value is substantially the same as the nominal interval.

7. The method of claim 5, in which the spacing on the medium between each pair of control transitions is smaller than half the gap length of the associated readhead.

8. A magnetic recording system comprising:

a movable magnetic storage medium;

a source of binary data to be recorded;

means responsive to the source for recording the binary data on the storage medium as data transitions in magnetization between two saturation states occurring at multiples of a nominal time interval;

means for recording at least one pair of control transitions in between successive data transitions on the storage medium whenever successive data transitions occur at some given multiple of the nominal time interval that is larger than one, the time interval between the pair of control transitions being substantially smaller than the nominal time interval;

means for sensing variations in the speed of the storage medium during the recording of the transitions; and means responsive to the sensing means for adjusting the time of occurrence of the data and control transitions as the speed of the medium varies to maintain a predetermined spacing between the successive data transitions and between the data transitions and the control transitions.

9. The recording system of claim 8, in which the medium has recorded on it a plurality of clock transitions spaced at substantially constant intervals along its length; the means for recording control transitions comprises a binary counter capable of assuming a plurality of states responsive to successive trigger pulses, a source of trigger pulses occurring at a frequency that is a multiple of the reciprocal of the nominal time interval, means for coupling the source of trigger pulses to the counter to advance the state of the counter at the frequency of the trigger pulses, and means for recording the pair of control transitions at points in time defined respectively by first and second given states of the counter; the sensing means comprises means for sensing the clock transitions as the medium moves during recording; and the adjusting means comprises means responsive to the variations in phase between the clock transitions and a third given state of the counter for changing the frequency of the trigger pulses from the source so as to synchronize the third given state of the counter to the clock transitions.

10. The recording system of claim 9, in which the means for recording data transitions records the data transitions at points in time defined by a fourth state of the counter.

11. The recording system of claim 10, in which the third state of the counter precedes the first and second states of the counter.

12. The recording system of claim 11, in which the fourth state of the counter lies between the first and second states of the counter.

13. The recording system of claim 12, in which the counter has eight states, the control transitions being defined by the third and sixth states, the data transition being defined by the fifth state.

14. An information storage and retrieval system comprising:

a movable magnetic storage medium on which information is stored as transitions in magnetization between two saturation states, the medium having stored on a portion of it a plurality of clock transitions spaced at substantially constant intervals along its length and having a portion reserved for the storage of data as data transitions;

means for sensing the clock transitions as the medium moves;

means responsive to each sensed clock transition during data retrieval for generating a group of successive strobe pulses, the sum of the durations of the group of strobe pulses equaling the period between clock transitions;

means for adjusting the durations of the strobe pulses as the period between clock transitions varies;

means responsive to one of the strobe pulses of each group during data retrieval for sensing the data transitions on the medium;

a source of binary data to be stored on the medium;

means responsive to the source of binary data and to one of the strobe pulses of a group during data storage for recording the binary data on the storage medium as data transitions between two saturation states occurring at multiples of the period between clock transitions; and means responsive to the source of binary data and to two of the strobe pulses of a group during data storage for recording at least one pair of control transitions in between successive data transitions on the storage medium whenever successive data transitions occur at some given multiple of the period between clock transitions that is larger than one, the time interval between the pair of control transitions being substantially smaller than the time interval between the clock transitions.

15. The system of claim 14, in which the means for generating a group of successive strobe pulses comprises an oscillator having a frequency that is nominally a multiple of the frequency at which the clock transitions are sensed as the medium moves, a counter that has a number of states equal to the frequency multiple of the oscillator, and means for coupling the oscillator to the counter to advance the state of the counter at the frequency of the oscillator and the adjusting means comprises means for sensing the phase difference between the clock transitions and one of the strobe pulses to generate a control signal and means responsive to the control signal for changing the frequency of the oscillator.

16. The system of claim 15, in which the means for sensing the data transitions includes a magnetic readhead having a gap length that is too small to resolve the recorded pair of control transitions.

* * * * *